(12) United States Patent
Farrokhi et al.

(10) Patent No.: US 8,111,790 B2
(45) Date of Patent: Feb. 7, 2012

(54) MITIGATING INTERFERENCE IN A CODED COMMUNICATION SYSTEM

(75) Inventors: Farrokh Farrokhi, San Ramon, CA (US); Andrea Goldsmith, Menlo Park, CA (US); Fredrik Brannstrom, Mountain View, CA (US); Behrooz Rezvani, San Ramon, CA (US)

(73) Assignee: Quantenna Communications Inc., Sunnyvale, CA (US)

( * ) Notice: Subject to any disclaimer, the term of this patent is extended or adjusted under 35 U.S.C. 154(b) by 730 days.

(21) Appl. No.: 12/288,569

(22) Filed: Oct. 20, 2008

(65) Prior Publication Data

US 2009/0116541 A1      May 7, 2009

Related U.S. Application Data

(60) Provisional application No. 60/981,462, filed on Oct. 19, 2007.

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. ........ 375/346; 375/260; 375/227; 375/148; 375/285; 455/63.1; 455/226.1; 455/296

(58) Field of Classification Search ............... 375/260, 375/227, 148, 144, 346, 340, 284, 285; 455/63.1, 455/226.1, 226.2, 226.3, 296
See application file for complete search history.

(56) References Cited

U.S. PATENT DOCUMENTS

| | | | |
|---|---|---|---|
| 5,268,695 A | 12/1993 | Dentinger et al. |
| 5,729,558 A | 3/1998 | Mobin |
| 6,035,007 A | 3/2000 | Khayrallah et al. |
| 6,081,700 A | 6/2000 | Salvi et al. |
| 6,351,499 B1 | 2/2002 | Paulraj et al. |
| 6,470,047 B1 | 10/2002 | Kleinerman et al. |
| 6,477,208 B1 | 11/2002 | Huff |
| 6,477,213 B1 | 11/2002 | Miyoshi et al. |
| 6,484,285 B1 | 11/2002 | Dent |
| 6,642,904 B2 | 11/2003 | Yokoshima et al. |

(Continued)

FOREIGN PATENT DOCUMENTS

WO      WO-2007021159 A2      2/2007

(Continued)

OTHER PUBLICATIONS

Ratfai et al., *IEEE Custom Integrated Circuit Conference*, P-41-1:357-361 (2005).

(Continued)

*Primary Examiner* — Phuong Phu

(57) ABSTRACT

A technique weights noise power used in a demodulation/demapping process using on an estimate of interference and its associated power. Using this technique the effect of partial interference can be ameliorated. For example, a value, $\sigma^2$, can be used to represent the estimated noise and interference power, and $\sigma^2$ can be used to modify a received signal to ameliorate the effects of noise and interference. $\sigma^2$ can be adjusted in response to partial interference, and can be represented by the formula: $\sigma^2 = \sigma_N^2 + q\,\sigma_I^2$, where $\sigma_N^2$ is "noise power," $\sigma_I^2$ is "interference power," and q is an interference correction factor.

13 Claims, 11 Drawing Sheets

U.S. PATENT DOCUMENTS

| | | | |
|---|---|---|---|
| 6,661,832 B1 * | 12/2003 | Sindhushayana et al. | 375/144 |
| 6,807,404 B2 | 10/2004 | Meijer | |
| 6,967,598 B2 | 11/2005 | Mills | |
| 7,035,343 B2 | 4/2006 | Chi et al. | |
| 7,058,422 B2 | 6/2006 | Learned et al. | |
| 7,076,263 B2 | 7/2006 | Medvedev et al. | |
| 7,194,237 B2 | 3/2007 | Sugar et al. | |
| 7,224,743 B2 | 5/2007 | Holmes et al. | |
| 7,298,798 B1 | 11/2007 | Chao et al. | |
| 7,321,636 B2 | 1/2008 | Harel et al. | |
| 7,400,872 B2 | 7/2008 | Kogure | |
| 7,450,631 B2 * | 11/2008 | Pick et al. | 375/148 |
| 7,450,657 B2 | 11/2008 | Paulraj et al. | |
| 7,564,931 B2 | 7/2009 | Venkataramani et al. | |
| 7,623,836 B1 | 11/2009 | Finkelstein | |
| 2002/0163879 A1 | 11/2002 | Li et al. | |
| 2002/0181624 A1 * | 12/2002 | Gonzalez et al. | 375/346 |
| 2003/0003863 A1 | 1/2003 | Thielecke et al. | |
| 2003/0081701 A1 | 5/2003 | Pick et al. | |
| 2003/0087673 A1 | 5/2003 | Walton et al. | |
| 2003/0141938 A1 | 7/2003 | Poklemba et al. | |
| 2003/0157954 A1 | 8/2003 | Medvedev et al. | |
| 2003/0185309 A1 | 10/2003 | Pautler et al. | |
| 2004/0013209 A1 | 1/2004 | Zehavi et al. | |
| 2004/0234012 A1 | 11/2004 | Rooyen | |
| 2004/0240486 A1 | 12/2004 | Venkatesh et al. | |
| 2005/0053172 A1 | 3/2005 | Heikkila | |
| 2005/0085269 A1 | 4/2005 | Buljore et al. | |
| 2005/0099937 A1 | 5/2005 | Oh et al. | |
| 2005/0113041 A1 | 5/2005 | Polley et al. | |
| 2005/0130694 A1 | 6/2005 | Medvedev et al. | |
| 2005/0170839 A1 | 8/2005 | Rinne et al. | |
| 2005/0192019 A1 | 9/2005 | Kim et al. | |
| 2005/0195784 A1 | 9/2005 | Freedman et al. | |
| 2005/0220057 A1 | 10/2005 | Monsen | |
| 2005/0245201 A1 | 11/2005 | Ella et al. | |
| 2005/0265470 A1 | 12/2005 | Kishigami et al. | |
| 2005/0276361 A1 | 12/2005 | Kim et al. | |
| 2006/0034217 A1 | 2/2006 | Kwon et al. | |
| 2006/0034221 A1 | 2/2006 | Karaoguz et al. | |
| 2006/0083290 A1 | 4/2006 | Shin et al. | |
| 2006/0223487 A1 | 10/2006 | Alam et al. | |
| 2006/0270427 A1 | 11/2006 | Shida et al. | |
| 2006/0276227 A1 | 12/2006 | Dravida | |
| 2007/0136446 A1 | 6/2007 | Rezvani et al. | |
| 2007/0153924 A1 | 7/2007 | Ling et al. | |
| 2007/0202818 A1 | 8/2007 | Okamoto | |
| 2007/0258534 A1 | 11/2007 | Schmidt | |
| 2008/0139123 A1 | 6/2008 | Lee et al. | |

FOREIGN PATENT DOCUMENTS

| | | |
|---|---|---|
| WO | WO-2007130578 | 11/2007 |

OTHER PUBLICATIONS

Ratfai et al., *IEEE Journal of Solid State Circuits*, 42(6):1291-1299 (2007).
Co-pending U.S. Appl. No. 11/653,135, filed Jan. 11, 2007.
Final Office Action Mailed May 11, 2010 in Co-pending U.S. Appl. No. 11/653,135, filed Jan. 11, 2007.
Non-Final Office Action Mailed Dec. 31, 2009 in Co-pending U.S. Appl. No. 11/653,135, filed Jan. 11, 2007.
Non-Final Office Action Mailed Jun. 8, 2009 in Co-pending U.S. Appl. No. 11/653,135, filed Jan. 11, 2007.
Co-pending U.S. Appl. No. 11/800,378, filed May 4, 2007.
Co-pending U.S. Appl. No. 12/299,470, filed Mar. 19, 2009.
Co-pending U.S. Appl. No. 11/872,700, filed Oct. 15, 2007.
Co-pending U.S. Appl. No. 11/800,357, filed May 4, 2007.
Non-Final Office Action Mailed May 4, 2010 in Co-pending U.S. Appl. No. 11/800,357, filed May 4, 2007.
Giallorenzi et al., "Noncoherent Sequence Demodulation for Trellis Coded M-DPSK", Military Communications Conference, 1991, MILCOM '91, Conference Record, Military Communication in a Changing World, IEEE, vol. 3, Nov. 1991, pp. 1023-1027.
Hong et al., "Detection of Amplitude-Phase Modulated Signals Over Frequency Nonselective Rayleigh Fading Channels with Adaptive Symbol-Aided Channel Estimation", 1996, Vehicular Technology Conference, 1996, Mobile Technology for the Human Race, IEEE 46th, vol. 2, pp. 983-987.
Written Opinion of PCT/US07/10845 dated Jul. 28, 2008, pp. 1-7.
International Search Report of PCT/US2008/011965 dated Mar. 25, 2009, pp. 1-3.
Written Opinion of PCT/US2008/0119655 dated Mar. 25, 2009, pp. 1-6.
International Search Report of PCT/US07/10845 dated Jul. 28, 2008, pp. 1-3.
Office Action mailed May 4, 2011 from U.S. Appl. No. 11/653,135, filed Jan. 11, 2007.
Office Action mailed Dec. 7, 2010 from U.S. Appl. No. 11/800,378, filed May 4, 2007.
Notice of Allowance mailed Mar. 17, 2011 from U.S. Appl. No. 11/800,378, filed May 4, 2007.
Office Action mailed Jan. 26, 2011 from U.S. Appl. No. 12/299,470, filed Mar. 19, 2009.
Office Action mailed Feb. 15, 2011 from U.S. Appl. No. 11/872,700, filed Oct. 15, 2007.
Notice of Allowance mailed May 23, 2011 from U.S. Appl. No. 11/872,700, filed Oct. 15, 2007.
Office Action mailed Dec. 22, 2010 from U.S. Appl. No. 11/800,357, filed May 4, 2007.
Notice of Allowance dated May 12, 2011 from U.S. Appl. No. 11/800,357, filed May 4, 2007.
Non-Final Office Action Mailed Aug. 5, 2010, in Co-Pending U.S. Appl. No. 11/872,700, filed Oct. 15, 2007.

* cited by examiner

MITIGATING INTERFERENCE IN A CODED COMMUNICATION SYSTEM

CROSS-REFERENCE TO RELATED APPLICATIONS

The present application claims priority to U.S. Provisional Patent App. No. 60/981,462, filed on Oct. 19, 2007, and which is incorporated herein by reference.

BACKGROUND

As wireless systems become more prevalent, interference between systems operating in the same frequency band become more common. Interference degrades performance by reducing the received signal-to-interference-plus-noise ratio (SINR), which impacts packet-error-rates and overall performance.

Estimating the presence of interference and its characteristics can be complex to implement. In order to reduce complexity, the estimate can be made using algorithms that are inferior to optimal algorithms at providing an accurate estimate. One technique employed to reduce complexity assumes the interference is white Gaussian noise. A value, $\sigma^2$, is often used to represent the estimated noise and interference power, and $\sigma^2$ is used to demodulate a received signal in the presence of noise and interference, possibly imperfectly.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique weights noise power used in a demodulation/demapping process using an estimate of interference and its associated power. Using this technique the effect of partial interference can be ameliorated. For example, a value, $\sigma^2$, can be used to represent the estimated noise and interference power, and $\sigma^2$ can be used to modify a received signal to ameliorate the effects of noise and interference. $\sigma^2$ can be adjusted in response to partial interference, and can be represented by the formula: $\sigma^2 = \sigma_N^2 + q\,\sigma_I^2$, where $\sigma_N^2$ is "noise power," $\sigma_I^2$ is "interference power," and q is an interference correction factor.

This technique is applicable to wide-band systems such as, for example, 802.11 standards-compliant systems operating in the same spectrum as a narrowband or frequency hopping signal such as, for example, Bluetooth. The technique is also applicable to narrowband systems that have intermittent interference, particularly if the presence of this intermittent interference can be quickly detected and used in the demodulation process.

The description in this paper describes this technique and examples of systems implementing this technique.

BRIEF DESCRIPTION OF THE DRAWINGS

Examples of the claimed subject matter are illustrated in the figures.

DETAILED DESCRIPTION

In the following description, several specific details are presented to provide a thorough understanding of examples of the claimed subject matter. One skilled in the relevant art will recognize, however, that one or more of the specific details can be eliminated or combined with other components, etc. In other instances, well-known implementations or operations are not shown or described in detail to avoid obscuring aspects of the claimed subject matter.

Figure 1:
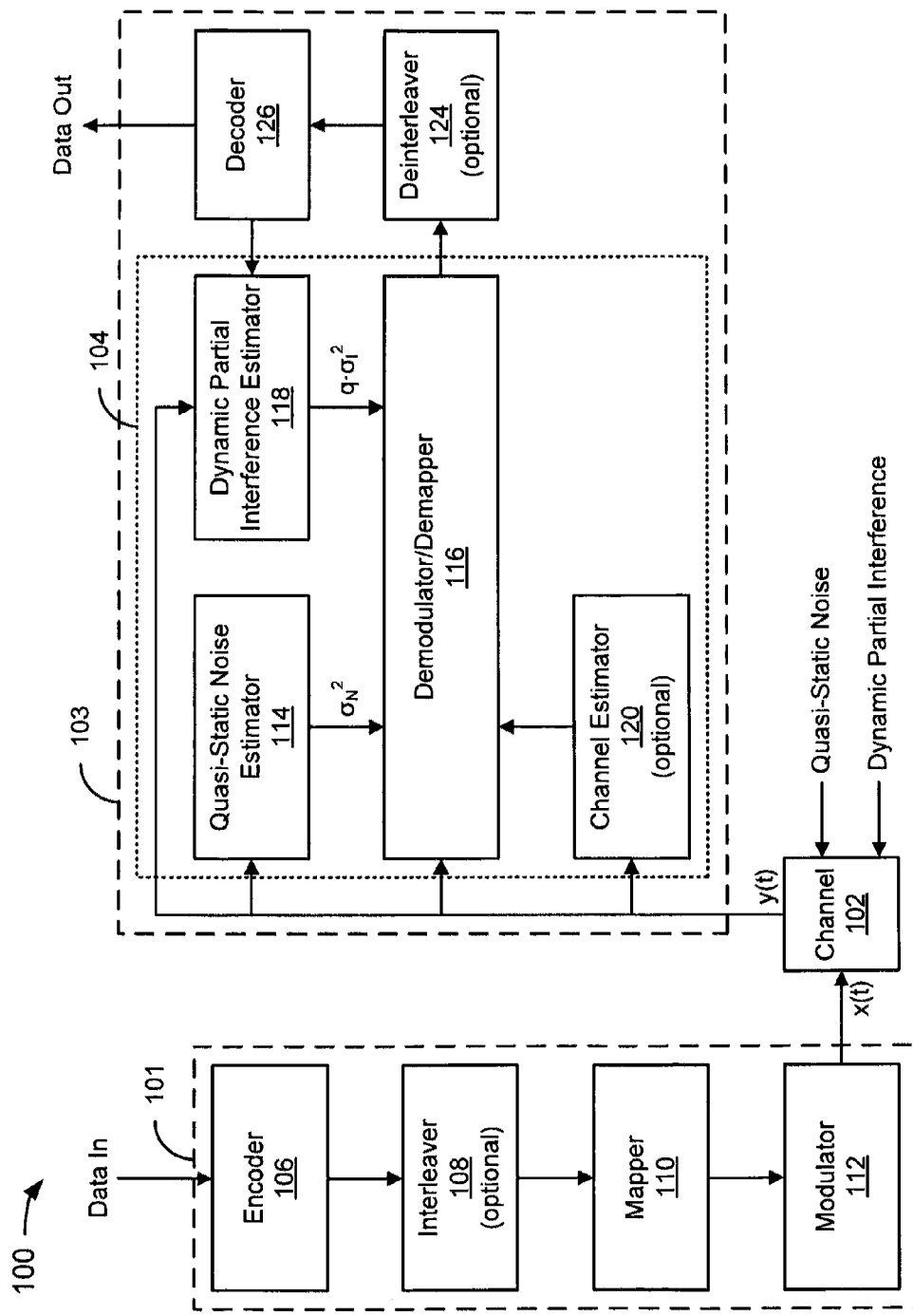
FIG. 1 depicts an example of a signal processing system with partial interference amelioration capabilities.

FIG. 1 depicts an example of a signal processing system 100 with partial interference amelioration capabilities in a receiver. In the example of FIG. 1, the system 100 includes a transmitter block 101, a channel 102, and a receiver block 103, which includes a partial interference amelioration block 104. In the example of FIG. 1, the transmitter block 101 includes an encoder 106, an optional interleaver 108, a mapper 110, and a modulator 112. The receiver block 103 includes, within the partial interference amelioration block 104, a quasi-static noise estimator 114, a demodulator/demapper 116, a dynamic partial interference estimator 118, an optional channel estimator 120, and an optional channel compensator 122; an optional deinterleaver 124; and a decoder 126.

The encoder 106 takes as input uncoded data bits, "data in," and outputs coded data bits. These coded bits may be more robust to errors introduced during transmission than the uncoded bits, since these errors can be removed through the decoding process at the receiver. Examples of encoders include repetition encoders, convolutional encoders, block encoders, turbo encoders, and low-density parity check (LDPC) code encoders. The encoder 106 may or may not also use puncturing to dynamically vary code rate and, thereby, the error protection of the code.

The interleaver 108 changes the order of coded bits input to the interleaver so that coded bits adjacent to each other at the interleaver input will be separated by other coded bits at the interleaver output. The interleaver is typically used in conjunction with the encoder 106 for the following reason. Encoders and their corresponding decoders in the receiver are designed to correct for some number (N) of consecutive coded bits received in error. In some cases signal transmission results in bursts of errors, for example when the signal experiences a deep fade due to multipath or shadowing. If an error burst results in more than N coded bits received in error, then the decoder cannot correct for them. An interleaver permutes the order of coded bits at its input, and in the receiver a corresponding deinterleaver unpermutes them. Thus, a string of M>N coded bits received in error, after unpermutes, would typically have fewer than N consecutive coded bits received in error, and hence the errors could be corrected by the error correction code, which typically can only correct for a few consecutive errors. There are different types of interleavers, such as block interleavers or convolutional interleavers.

The mapper 110 takes coded bits and maps them into complex signal constellations such as MPSK or MQAM. Note that the mapper 110 may be implemented jointly with the encoding in a coded modulation block. Examples of coded modulation include trellis coded modulation, lattice-coded modulation, and turbo-coded modulation.

The modulator 112 takes the signal constellations output from the mapper 110 and modulates them onto one or more carrier frequencies or tones. In the case of an orthogonal frequency-division multiplexing (OFDM) modulator, the modulator 112 modulates the signal constellations onto carrier frequencies or tones associated with the OFDM modulation. In an alternative, the modulator 112 or the combination of the mapper 110 and the modulator 112 may be replaced with a known or convenient type of modulator that maps coded bits or signal constellations to a modulated signal with a low peak-to-average power or amplitude ratio of the modulated signal.

In the example of FIG. 1, the transmitter block 101 generates a signal, which is provided over a channel 102, to the receiver block 103. The signal to the channel 102 is illustrated in the example of FIG. 1 as x(t), and this terminology is maintained throughout this description to refer to a signal for which the effects of the channel 102, if any, have not yet been applied. As was mentioned previously, the modulator 112 may be an OFDM modulator, in which case x(t) may represent an OFDM signal. The signal, x(t), may also be referred to as the "original" signal. It may be noted that any known or convenient components could be used for the purpose of generating a signal; the precise structure of the transmitter block 101 is not critical, as long as the transmitter block 101 is capable of generating x(t) in accordance with the techniques described herein.

The channel 102 typically introduces amplitude and/or multipath fading, quasi-static, constant and/or intermittent interference, and ambient noise to x(t), producing a signal y(t). The signal from the channel 102 is illustrated in the example of FIG. 1 as y(t), and this terminology is maintained throughout this description to refer to a signal for which the effects of channel noise and interference, if any, have not yet been ameliorated. The noise associated with the "channel" can be from hardware associated with the system 100, as well as noise and/or interference in the environment. The quasi-static noise can be measured when the receiver block 103 is not receiving data because the noise changes relatively slowly over time and frequency. The quasi-static noise also includes noise and/or interference that is relatively constant in time and frequency. The quasi-static noise can be assumed to have, for example, a white Gaussian distribution. Dynamic interference, on the other hand, can be measured during data reception because it can change relatively rapidly over time or frequency. Dynamic interference can include interference from any source, but changes with such rapidity that it is unlikely that the dynamic interference could be properly estimated by measuring it only when data is not being received. Dynamic partial interference includes partial interference.

The channel 102 can be associated with a multiple input multiple output (MIMO) system, which is described in greater detail with reference to later figures.

The receiver block 103 receives the signal, y(t), from the channel 102. In the example of FIG. 1, in operation, the receiver block 103 takes the signal, y(t), from the channel 102, performs partial interference amelioration on the signal, and provides data as output. In the example of FIG. 1, the receiver block 103 includes a quasi-static noise estimator 114, a demodulator/demapper 116, a dynamic partial interference estimator 118, an optional channel estimator 120.

The quasi-static noise estimator 114 receives the signal y(t), or data derived from y(t), and computes quasi-static noise power, $\sigma_N^2$, associated with the channel 102. This estimate is typically computed during times when the receiver block 103 is not receiving data. Any applicable known or convenient technique can be used to implement the quasi-static noise estimator 114, and one of skill in the relevant art may refer to the quasi-static noise estimator 114 as "part of" the demodulator/demapper 116. In the example of FIG. 1, the quasi-static noise estimator 114 provides $\sigma_N^2$ to the demodulator/demapper 116.

The demodulator/demapper 116 demodulates and/or demaps the signal, y(t), into "soft" coded bits which, rather than taking binary values, take continuous values in the form of log-likelihood ratios or a-posteriori probabilities associated with possible coded bit values. Appropriate demodulation/demapping functions that generate soft information include, for example, maximum likelihood or reduced-complexity maximum likelihood functions. The demodulator/demapper 116 can use channel estimation provided by the channel estimator 120.

If interference and noise have a white Gaussian distribution and the channel 102 is perfectly known, then optimal soft information can be generated based on the total power of noise, $\sigma_N^2$, plus interference, $\sigma_I^2$. Specifically, in the presence of interference and noise, the soft information can be computed based on an effective noise $\sigma^2 = \sigma_N^2 + \sigma_I^2 = \sigma_N^2 \cdot w$, where the "weight" w is given by $w = 1 + q(\sigma_I^2/\sigma_N^2)$. It should be noted that noise and interference would typically be added together for the purposes of determining SINR-related values, though $\sigma_N^2$ and $\sigma_I^2$ could conceivably be combined in some other way, especially in the case that the interference does not have a Gaussian distribution. It should also be noted that $\sigma_N^2$ would typically be multiplied by the weight, w, though $\sigma_N^2$ and w could conceivably be combined in some other way.

It may be noted that if there is no interference, then q=0 (and w=1) and the soft information can be generated based on $\sigma^2 = \sigma_N^2 \cdot w = \sigma_N^2$, i.e., based on noise power only. On the other hand, if interference is known to exist then the soft information can be generated based on effective noise power, which is optimal for white Gaussian interference or interference with a flat spectrum across the signal band of the modulated symbol. Note that in an OFDM system, all of these quantities are indexed by the OFDM subchannel. More generally, $\sigma_I^2$ and q are functions of frequency, time, and the spatial dimension (f, t, s), and can therefore be written as $\sigma_I^2(f,t,s)$ and $q(f,t,s)$, respectively. For illustrative simplicity, the reference to (f,t,s) is sometimes dropped. For MIMO systems, the spatial dimension "s," i.e., the dimension associated with the 's' spatial streams.

In the example of FIG. 1, the dynamic partial interference estimator 118 provides $q \cdot \sigma_I^2$ to the demodulator/demapper 116. This dynamic interference estimate is typically done during data reception to best track the dynamics. One way to combine q and $\sigma_I^2$ is by multiplication. However, q and $\sigma_I^2$ could conceivably be combined in other ways. Thus, the "·" in the expression "$q \cdot \sigma_I^2$" should be read as "dot" with the understanding that "dot" typically means multiplication, but need not. The dynamic partial interference estimator 118 receives the signal y(t), or data derived from y(t), and computes interference power, $\sigma_I^2$, and an interference correction factor, q, both of which are associated with the signal y(t).

The interference correction factor, q, can take into account relatively constant considerations, c, as well as probabilities, p. When expressed as a formula, q=cp. The relatively constant considerations, c, can include by way of example but not limitation, type of interference (e.g., Bluetooth (BT), microwave, etc.), spatial signature, type of demodulation/demapping implemented at the demodulator/demapper 116, etc. The probability, p, can take into account the probability interference will be expressed at a given location (e.g., frequency, time, and the spatial dimension) and perhaps the reliability of the interference power, $\sigma_I^2$. In this way, estimates, probabilities, or explicit adjustments can be associated with $\sigma_I^2$ and q.

For example, the presence and/or power of a partial interferer can be determined by measurements between and/or during symbol transmissions and/or by decision-directed updates of these estimates. The interference correction value, q, can take into account the reliability of a partial interference power estimate. For instance, p can be set close to or at zero if an interference power measurement is thought to be inaccurate, and p can be set close to or at one when there is high confidence in this estimate.

It should be noted that to the extent the interference correction factor, q, and in particular the relatively constant considerations, c, are inherent to or derived from various components of the system 100, the dynamic partial interference estimator 118 could be considered "part of" one or more of those components. For example, the dynamic partial interference estimator 118 could be considered "part of" the demodulator/demapper 116.

Depending upon the implementation and/or embodiment, the presence and/or power of a partial interferer can be inferred by measurements such as EVM or packet error rate per subchannel in an OFDM system. Advantageously, for systems where the receiver of the signal being partially interfered with and the partially interfering signal are co-located, such as is possible for an 802.11 receiver and a frequency hopping (FH) BT receiver, the partial interferer's receiver can inform the receiver of system 100 being interfered with of characteristics of the partial interference. 802.11 and BT make good examples because BT signals operate in the 2.4 GHz ISM band, and can cause significant interference to other signals operating in that band, including 802.11b, 802.11g and 802.11n signals. BT signals are narrowband (1 MHz) FH signals and their structure can be exploited by a decoder to mitigate the impact of BT interference on convolutionally-encoded or LDPC-encoded signals operating in the same frequency band, as is used in 802.11n systems. The techniques are applicable to ameliorating partial interference in other systems, too, such as by way of example but not limitation, cordless phone interference on Wifi systems, intermittent interference on Wifi and narrowband systems, subchannel interference in an OFDM mesh network, to name a few.

The partial interference characteristics correspond to $\sigma_I^2$ and q values associated with the partial interferer. In the 802.11/BT example, the $\sigma_I^2$ and q values can be based on the hopping pattern of the BT signal and the received power at the BT receiver. This is illustrated later with reference to the example of FIG. 2.

When interference is not white Gaussian noise, generating soft information based on the effective noise $\sigma^2 = \sigma_N^2 + \sigma_I^2$ is not necessarily optimal. It may be desirable to use information about the characteristics of the interference, including its power spectral density, to modify the values of $\sigma_I^2$ and q (or $\sigma_I^2$ (f,t,s) and q(f,t,s) for, e.g., an OFDM MIMO system) to achieve better performance. The characteristics of the interference signal may be learned via co-located receivers (as described later with reference to the example of FIG. 2) or via covariance noise measurements during idle transmission/reception times of the desired signal.

Figure 2:
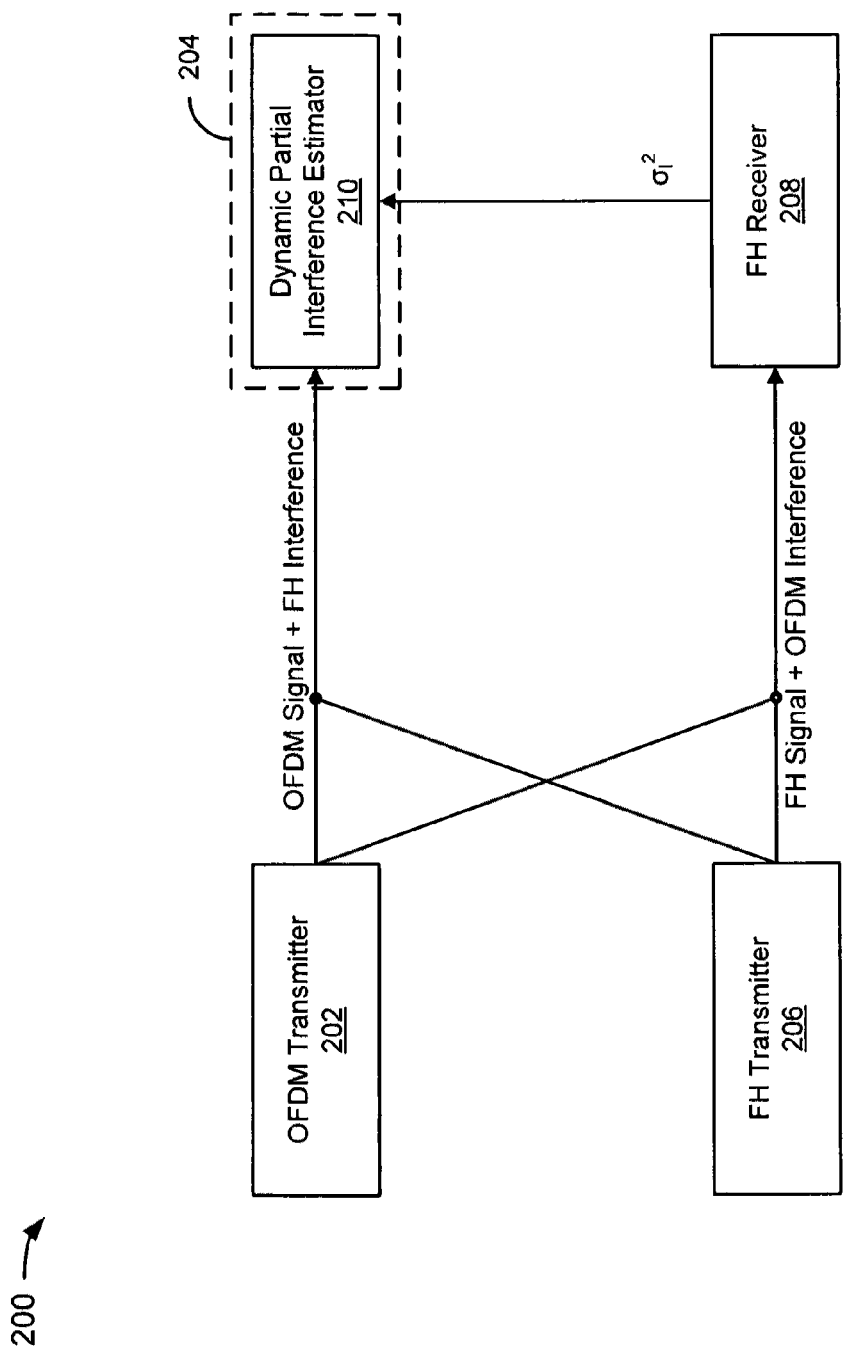
FIG. 2 depicts an example of a partial interference information sharing system.

FIG. 2 depicts an example of a partial interference information sharing system 200. In the example of FIG. 2, the system 200 includes an OFDM transmitter 202, an OFDM receiver 204, a FH transmitter 206, and a FH receiver 208. The OFDM receiver 204 includes a dynamic partial interference estimator 210. The dynamic partial interference estimator 210 can include a FH receiver similar to the FH receiver 208.

In the example of FIG. 2, the OFDM transmitter 202 transmits an OFDM signal to the OFDM receiver 204 and the FH transmitter 206 transmits a FH signal to the FH receiver 208. The OFDM receiver 204 receives the OFDM signal, along with interference associated with the FH signal ("FH interference"). The FH receiver receives the FH signal, along with interference associated with the OFDM signal ("OFDM interference"). Since the FH receiver 208 knows something about the FH signal, the FH receiver 208 can provide the dynamic partial interference estimator 210 of the OFDM receiver 204 with a signal power $\sigma_I^2$(f,t,s) that the dynamic partial interference estimator 210 will likely want to treat as the partial interference power at frequency f, time t.

The FH receiver 208 can also provide an interference correction value, q (not shown), associated with $\sigma_I^2$. Alternatively, the partial interferer input module 212 can derive q(f, t,s) from $\sigma_I^2$(f,t,s), which is provided by the FH receiver 208. In yet another alternative, $\sigma_I^2$(f,t,s) can be inherent in a signal received at the dynamic partial interference estimator 210, and the dynamic partial interference estimator 210 can derive $\sigma_I^2$(f,t,s) from the signal.

In an alternate embodiment, the partial interferer input module 212 can act as a "second" receiver inside the OFDM receiver 204 that is configured to receive a known signal that partially interferers with the OFDM signal received at the "first" receiver. In this alternative, the FH transmitter 206 need not be aware of the "second" receiver inside the OFDM receiver 204, and the FH receiver 208 need not be aware of a "second" receiver implemented in the OFDM receiver 204. The "second" FH receiver inside the OFDM receiver may determine the entire partially-interference signal or just certain parameters of it, such as $\sigma_I^2$. The partially-interfering signal or its parameters are computed by the second FH receiver and passed to the dynamic partial interference estimator 210, whose estimate is used in the demodulation of the OFDM signal. To possibly obtain better performance, the OFDM signal may be passed to the "second" FH receiver to subtract out the OFDM interference and obtain a better estimate of the FH signal or its parameters. Then, this better estimate can be passed to the dynamic partial interference estimator 210 or it can be passed to a demodulator to obtain a better estimate of the OFDM signal. This iterative decoding of the OFDM signal and its partial interference may continue over several iterations.

Although the example of FIG. 2 uses specific examples of OFDM and FH, the techniques described are broadly applicable. For example, the OFDM transmitter 202 and the OFDM receiver 204 could be any applicable communication system, and the FH transmitter 206 could be any applicable partial interferer transmitter of the communication system.

Returning once again to the example of FIG. 1, the channel estimator 120 can provide data to the demodulator/demapper 116 in a manner that is consistent with known or convenient techniques. The channel estimator 120 is optional because a system 100 could be designed without a channel estimator, but the channel estimator 120 is depicted in the example of FIG. 1 because it is likely that the channel estimator 120 would, in fact, be used.

The channel estimator 120 can provide advantages unique to the techniques described in this paper. For example, using the BT example once again, the channel estimator 120 can predict (via channel estimation) the likelihood of a BT signal impacting a particular subchannel. Since convolutional and LDPC codes can recover from multiple unreliable soft bits, as long as the number of subchannels affected by the BT interference is not too large, the system 100 may be able to perform almost as if there was no BT interference. The channel estimator 120 combined with the decoder 126 can be used by the dynamic partial interference estimator 118 to obtain a better interference estimate by mitigating the effects of the desired signal on the interference estimate.

The estimate of the channel is used by the demodulator/demapper to compensate for distortion. One of skill in the art would understand how to do this. A typical method for compensating for distortion is channel equalization, which uses channel estimation from the channel estimator 120.

Figure 3:
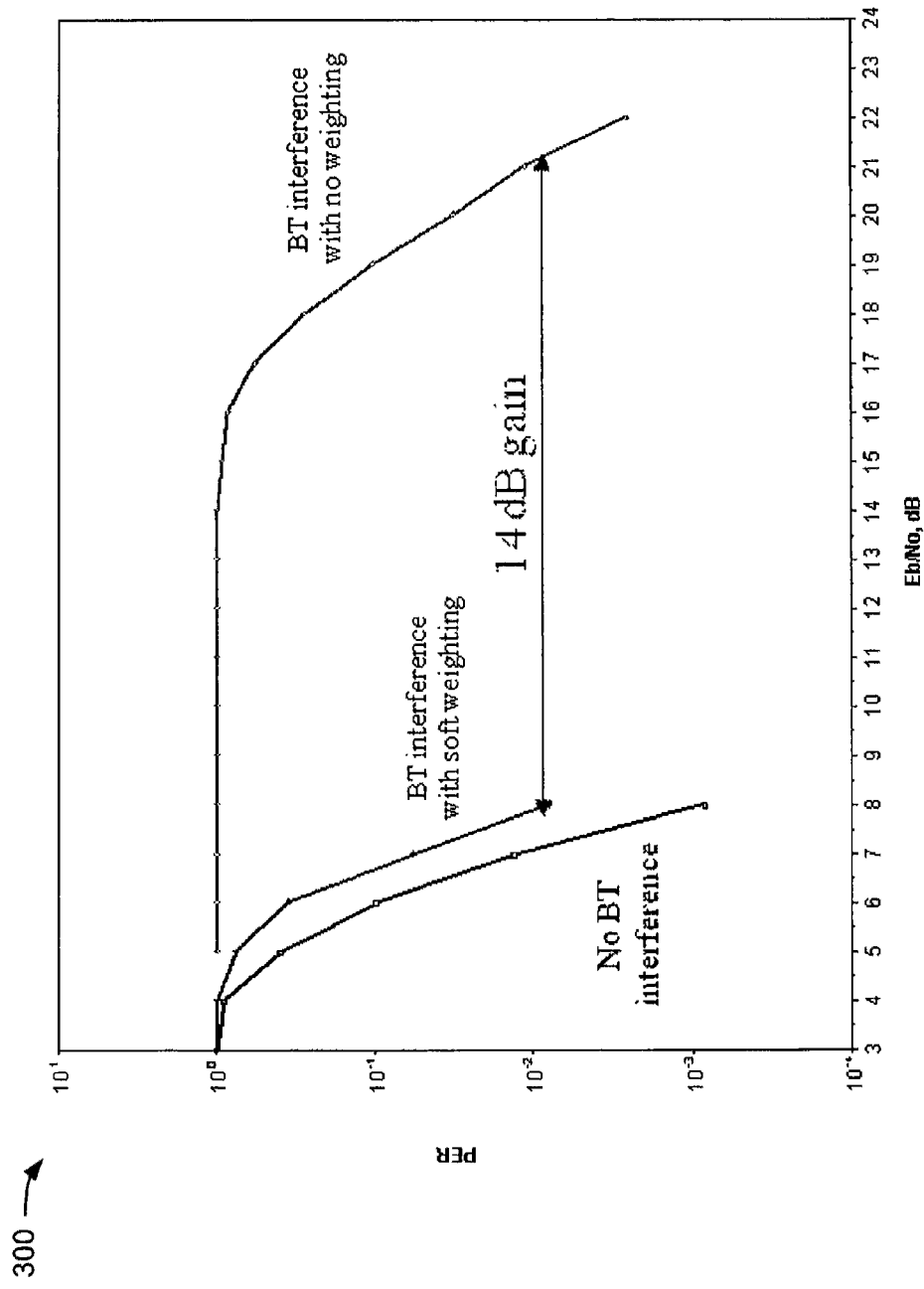
FIG. 3 depicts an example of a plot showing the performance gains of interference-weighting in a co-existing BT and Wifi system.

FIG. 3 depicts an example of a plot 300 showing the performance gains of interference-weighting in a co-existing BT and Wifi system.

Referring once again to the example of FIG. 1, after soft information has been generated by the demodulator/demapper 116, the soft information is provided from the demodulator/demapper 116 to the deinterleaver 124. The deinterleaver 124 is optional. It is likely that the deinterleaver 124 is present if the interleaver 108 is present in the transmitter block 101. The deinterleaver 124 can use known or convenient techniques to deinterleave the soft information.

The decoder 126 can use known or convenient techniques to decode the soft information. The output of the decoder 126 (and the receiver block 103) is data that was provided on the signal. Optionally, the decoder 126 can provide feedback to the dynamic partial interference estimator 118 to improve the partial interference estimate over time. Alternatively, the demodulator/demapper 116 could provide feedback to the dynamic partial interference estimator 118.

Figure 4:
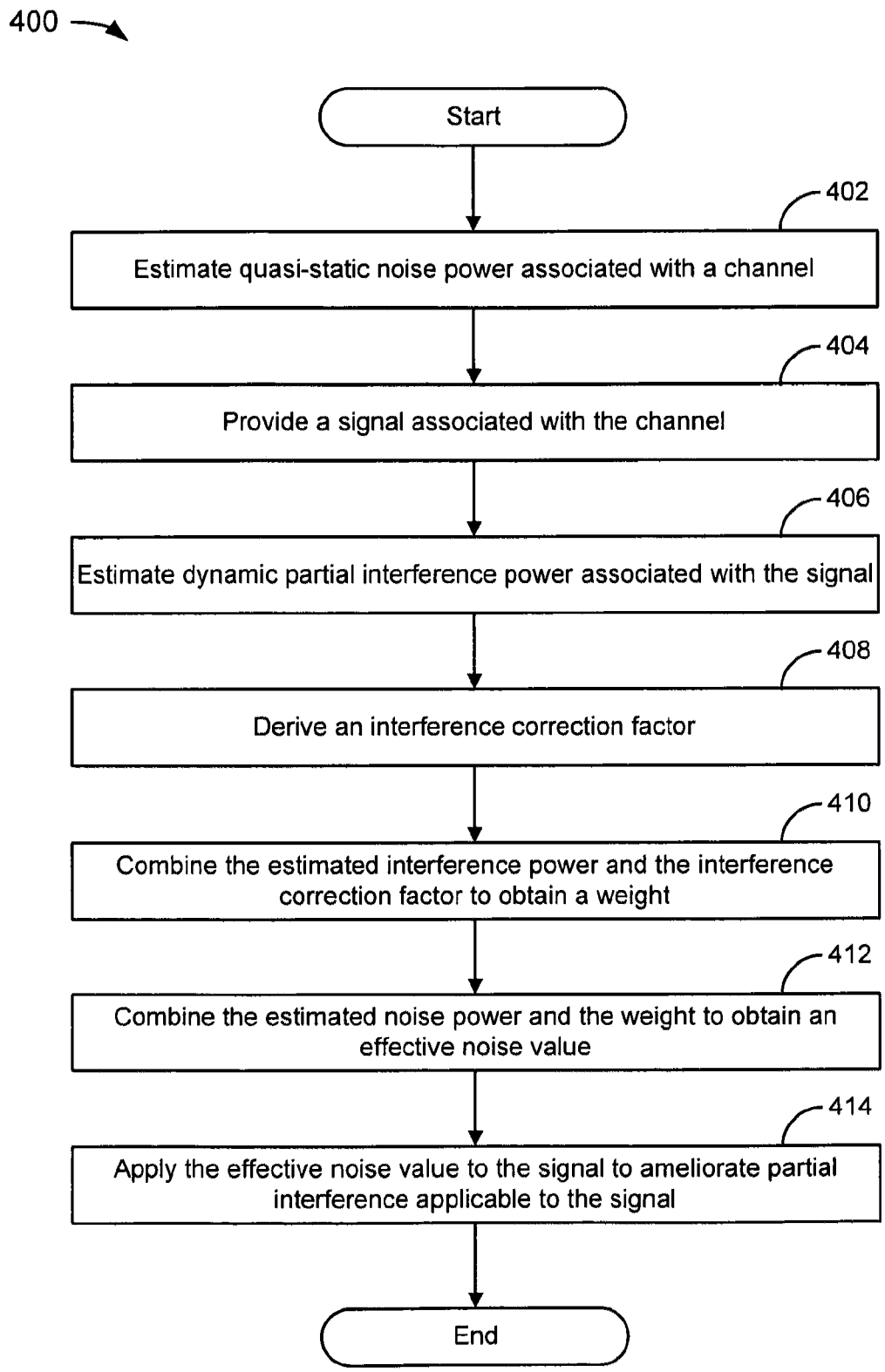
FIG. 4 depicts a flowchart of an example of a method for partial interference amelioration.

FIG. 4 depicts a flowchart 400 of an example of a method for partial interference amelioration. This method and other methods are depicted as serially arranged modules. However, modules of the methods may be reordered, or arranged for parallel execution as appropriate.

In the example of FIG. 4, the flowchart 400 starts at block 402 where quasi-static noise power associated with a channel is estimated. The noise power can be represented as $\sigma_N^2$.

In the example of FIG. 4, the flowchart 400 continues to block 404 where a signal associated with the channel is provided. The signal may be generated by, by way of example but not limitation, an OFDM modulator or some other signal generating block (see, e.g., FIG. 1, the transmitter block 101).

The flowchart 400 continues to block 406 where dynamic partial interference power associated with the signal is estimated. The dynamic partial interference power can be represented as $\sigma_I^2$. Notably, $\sigma_I^2$ can be a function of frequency, time, and the spatial dimension.

The flowchart 400 continues to block 408 where an interference correction factor is derived. The interference correction factor can be represented as q. Notably, q is a function of frequency, time, and the spatial dimension.

The flowchart 400 continues to block 410 where the estimated interference power and the interference correction factor are combined to obtain a weight.

The flowchart 400 continues to block 412 where the estimated noise and the weight are combined to obtain an effective noise value. The effective noise value can be represented as $\sigma^2$.

Figure 5:
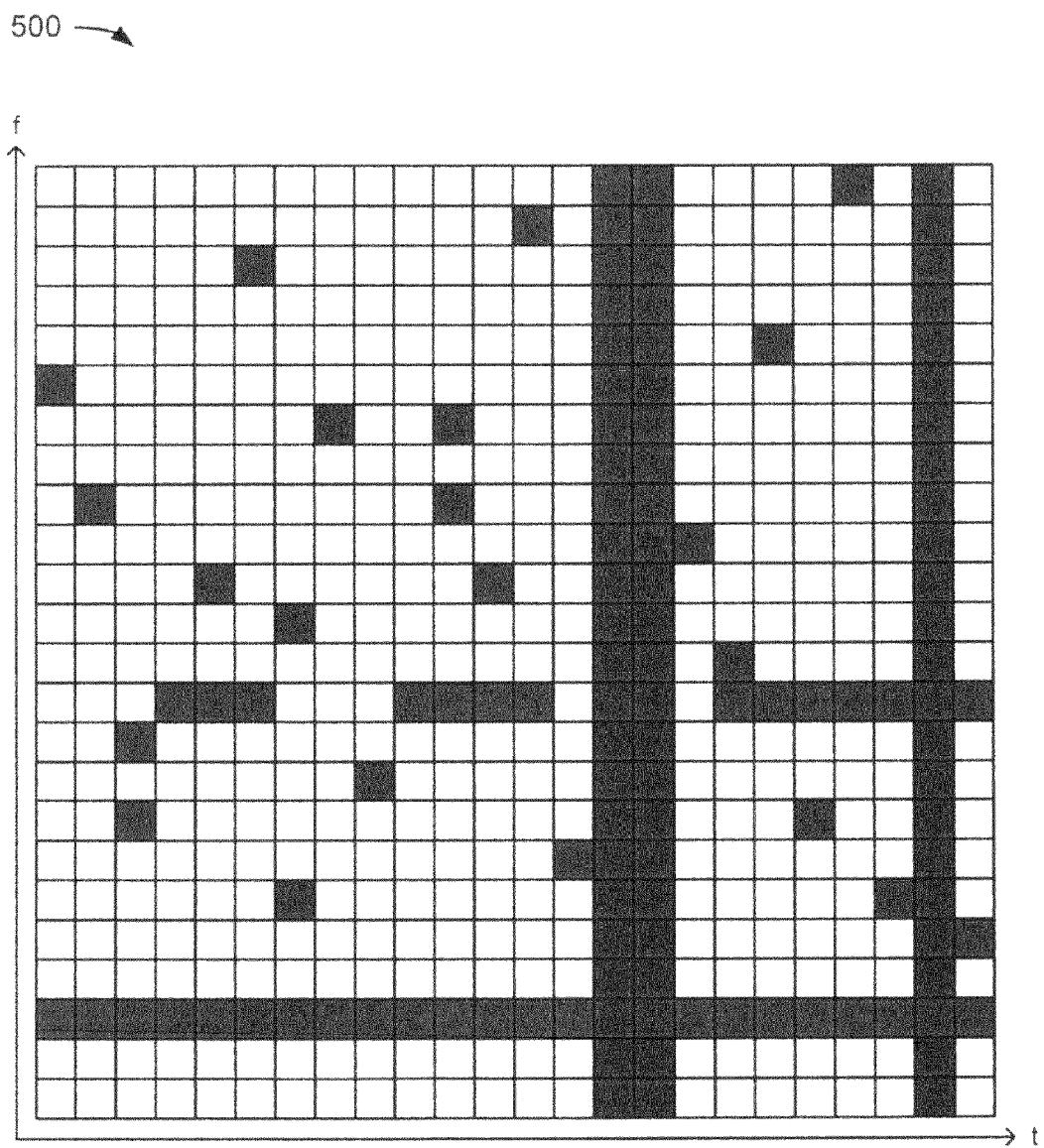
FIGS. 5-10 depict conceptual frequency-time grids for signals associated with partial interference.

FIG. 5 depicts a conceptual frequency-time grid 500. Where a wideband channel is represented as a conceptual grid with rows that correspond to a narrowband channel (corresponding to an index, f of the wideband channel and columns that correspond to time periods (corresponding to an index, t), each cell of grid can be associated with $\sigma^2$ having a value of $\sigma_N^2$ when interference associated with a partial interferer is not expressed, and with $\sigma^2$ having a value of $\sigma_N^2 + q \cdot \sigma_I^2$ when interference associated with a partial interferer is expressed. The cells that have expressed interference are "blackened" in the example of FIG. 5.

Some systems have narrowband channels. As used in this paper, a narrowband channel is a usable channel that spans a sub-range of a wider frequency range of a wider band channel. For example, the entire frequency range shown in the grid 500 could represent a wideband channel, and each of the boxes at a given time could represent a narrowband channel of the wideband channel. By the definition, the rows of the grid 500 are associated with usable narrowband channels. In the example of FIG. 5, the interference from various sources is expressed within narrowband channels, though a single source (or multiple sources) could span multiple narrowband channels at a given time.

It should be noted that there can be a spatial dimension to the grid 500 (e.g., for multi-antenna and/or MIMO systems), which would be along a third spatial dimension (corresponding to an index, s), with corresponding grids similar to that depicted in FIG. 5 for each spatial parameter along this third spatial dimension. For illustrative simplicity, the spatial dimension is not depicted.

It should be noted that the partial interference could express itself in a frequency range that is even smaller than a given narrowband channel, but it is assumed for illustrative purposes that the narrowband channel is a narrowest usable channel; so the partial interference acts as interference across the entire narrowband channel. For similar reasons, the channel represented in FIG. 5 as the collection of rows of the grid 500 would treat the partial interference as interference across the entire channel if it were not a wideband channel (with usable narrowband channels).

For the wideband channel in the example of FIG. 5, each of the row-column intersections will have an associated $\sigma^2$ value that is a function of f, t, and s. For those row-column intersections where partial interference is not expressed, the value of $\sigma^2$ is $\sigma_N^2$. For those row-column intersections where partial interference is expressed, the value of $\sigma^2$ is $\sigma_N^2 + q \cdot \sigma_I^2$.

The expression of interference in the example of FIG. 5 can correspond to practically any number of interference sources, having many different specific patterns of expression (e.g., intermittent, continuous, FH, etc.). FIGS. 6-10 depict conceptual frequency-time grids for signals associated with a specific pattern of partial interference.

Figure 6:
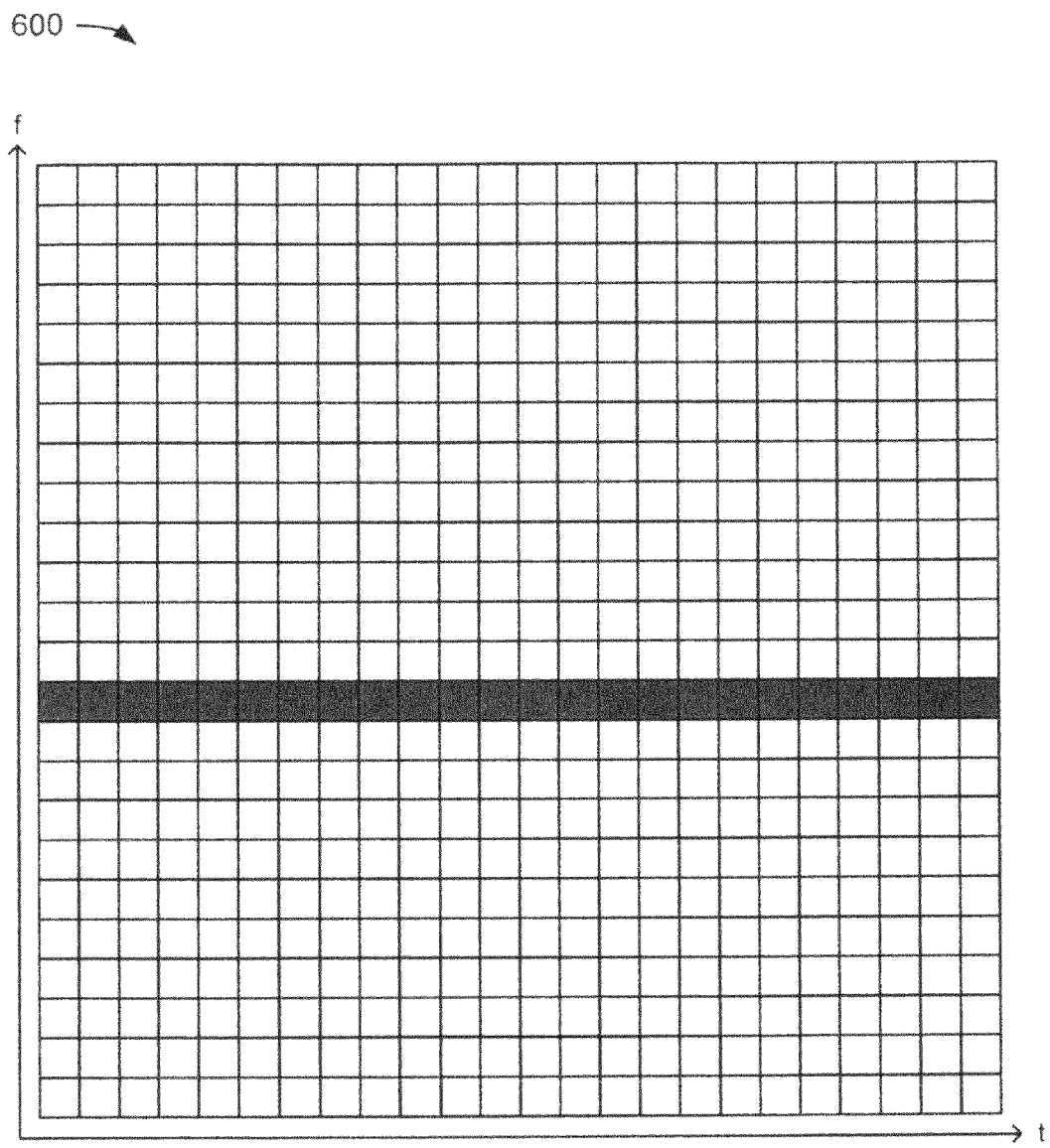

FIG. 6 depicts a conceptual frequency-time grid 600 for a continuous constant-frequency signal. In this example, for the wideband channel, the value of $\sigma^2$ is $\sigma_N^2$ except for one narrowband channel in the wideband channel. For that one narrowband channel within the wideband channel, the value of $\sigma^2$ is $\sigma_N^2 + q \cdot \sigma_I^2$. An example of a continuous constant-frequency signal could be, by way of example but not limitation, like a microwave oven that is on.

Figure 7:
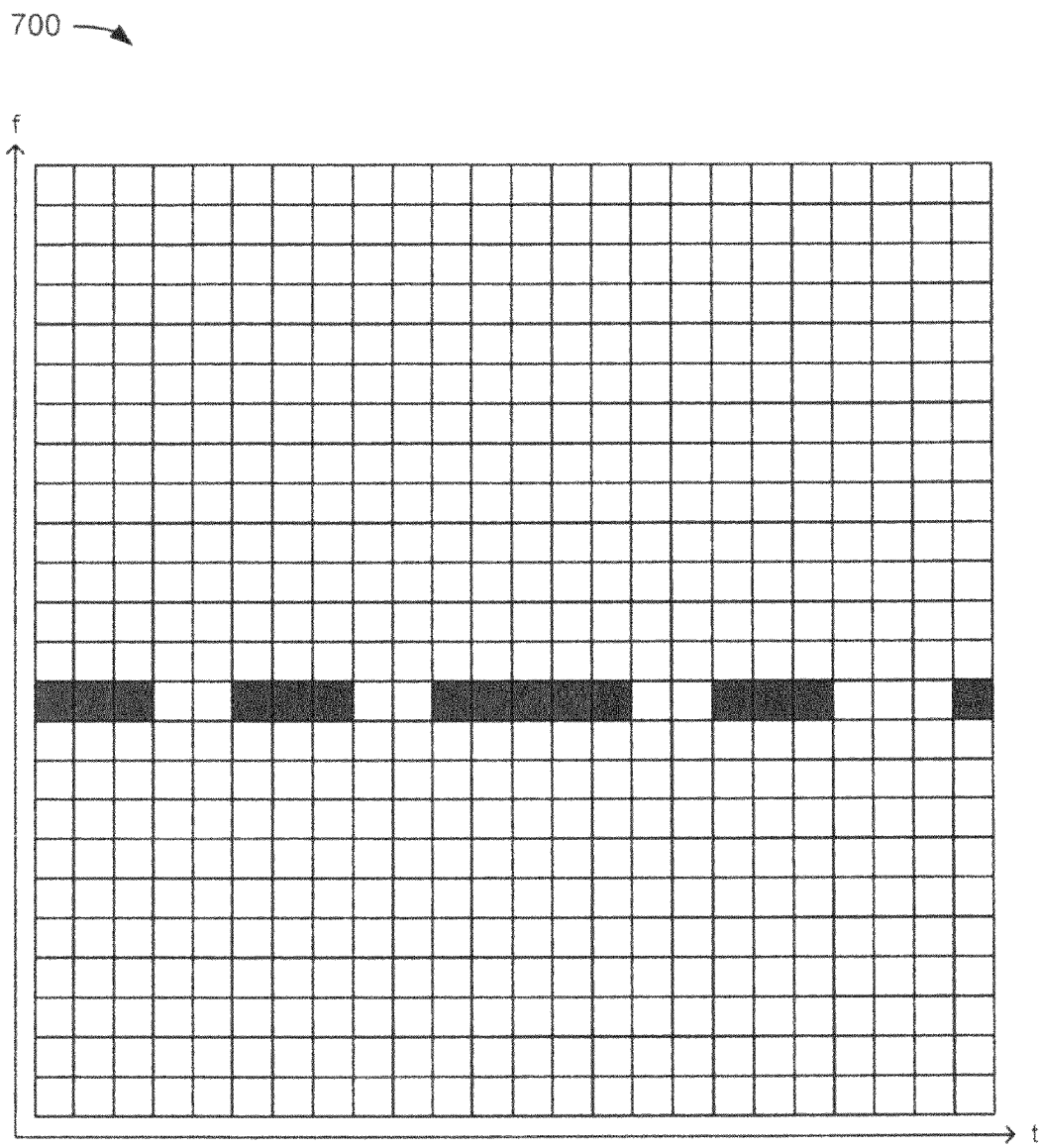

FIG. 7 depicts a conceptual frequency-time grid 700 for an intermittent constant-frequency signal. In this example, for the wideband channel in general, the value of $\sigma^2$ is $\sigma_N^2$.

However, for one narrowband channel the value of $\sigma^2$ is either $\sigma_N^2$ or $\sigma_N^2 + q \cdot \sigma_I^2$, depending upon whether the partial interference is expressing itself at the time. An example of an intermittent constant-frequency symbol could be, by way of example but not limitation, like periodic beacon frames broadcast by a wireless access point.

Figure 8:
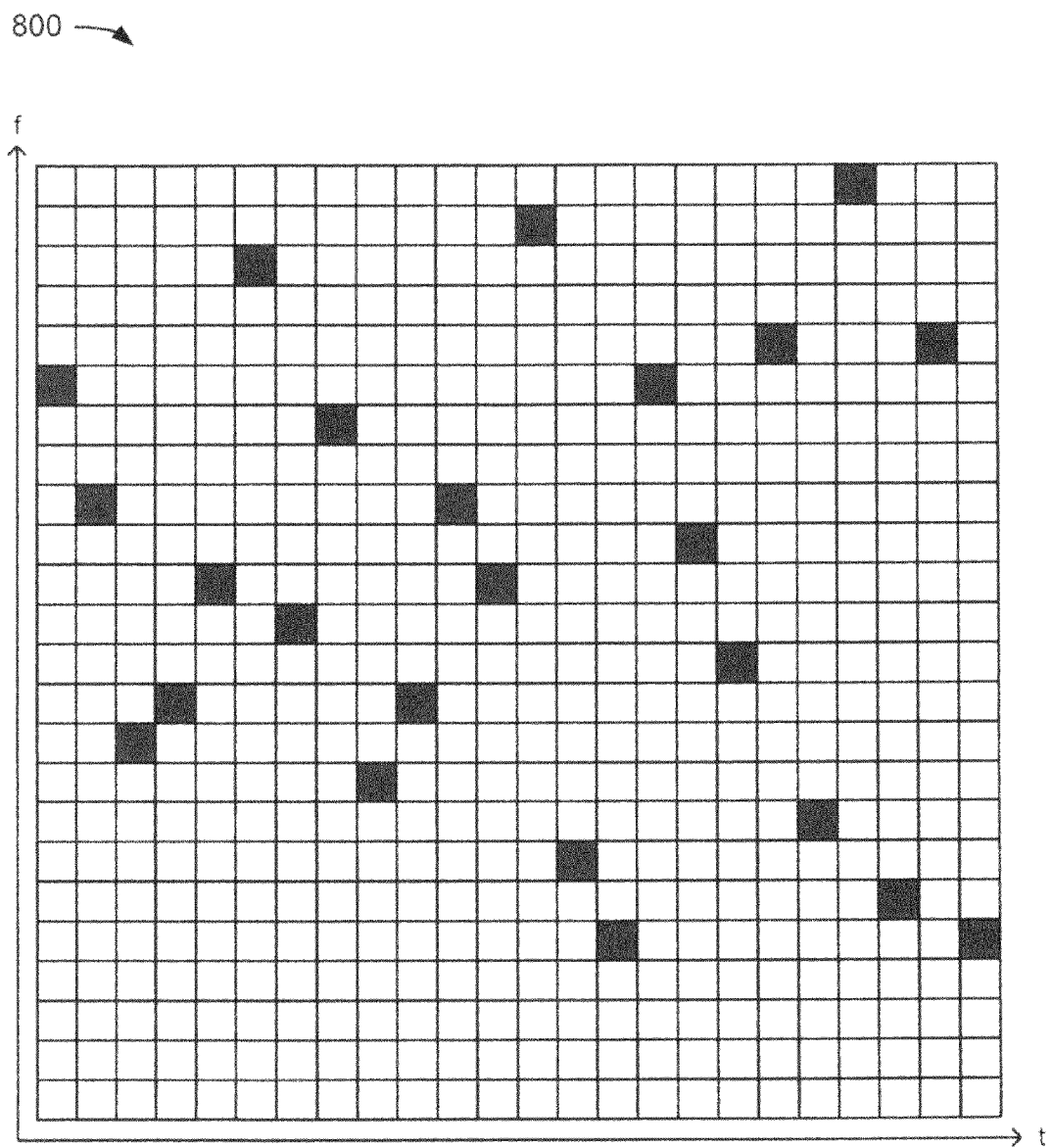

FIG. 8 depicts a conceptual frequency-time grid 800 for a partially interfering signal that has a continuous (in time) FH pattern. In the frequency-time grid 800, a FH signal is expressed at varying frequencies over time. FH signals typically hop from one frequency to another in a manner that is not necessarily predictable by receivers that are "out of the loop," (i.e., that do not know the hopping pattern of the FH signal). However, there is no technological reason why a system could not be implemented using a fixed FH pattern. An example of a continuous (in time) FH symbol could be, by way of example but not limitation, like BT.

Figure 9:
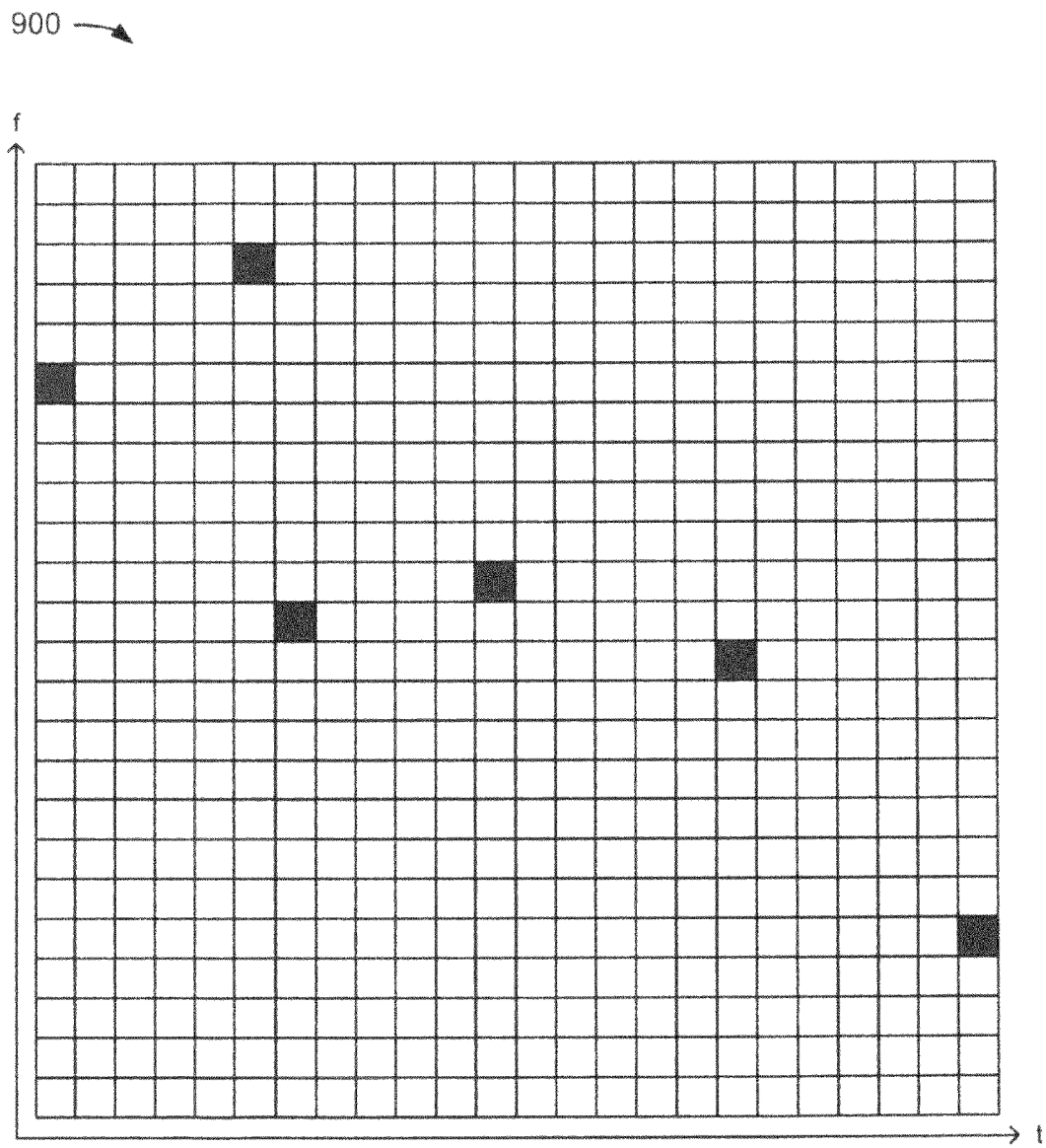

FIG. 9 depicts a conceptual frequency-time grid 900 for a partially interfering signal that has an intermittent FH signal. In this example, for the wideband channel in general, the value of $\sigma^2$ is $\sigma_N^2$. However, for a narrowband channel that varies over time, the value of $\sigma^2$ is either $\sigma_N^2$ or $\sigma_N^2 + q \cdot \sigma_I^2$, depending upon whether the partial interference is expressing itself at the time. An example of an intermittent FH signal is like a moving FH signal with intermittent deep channel fades.

Figure 10:
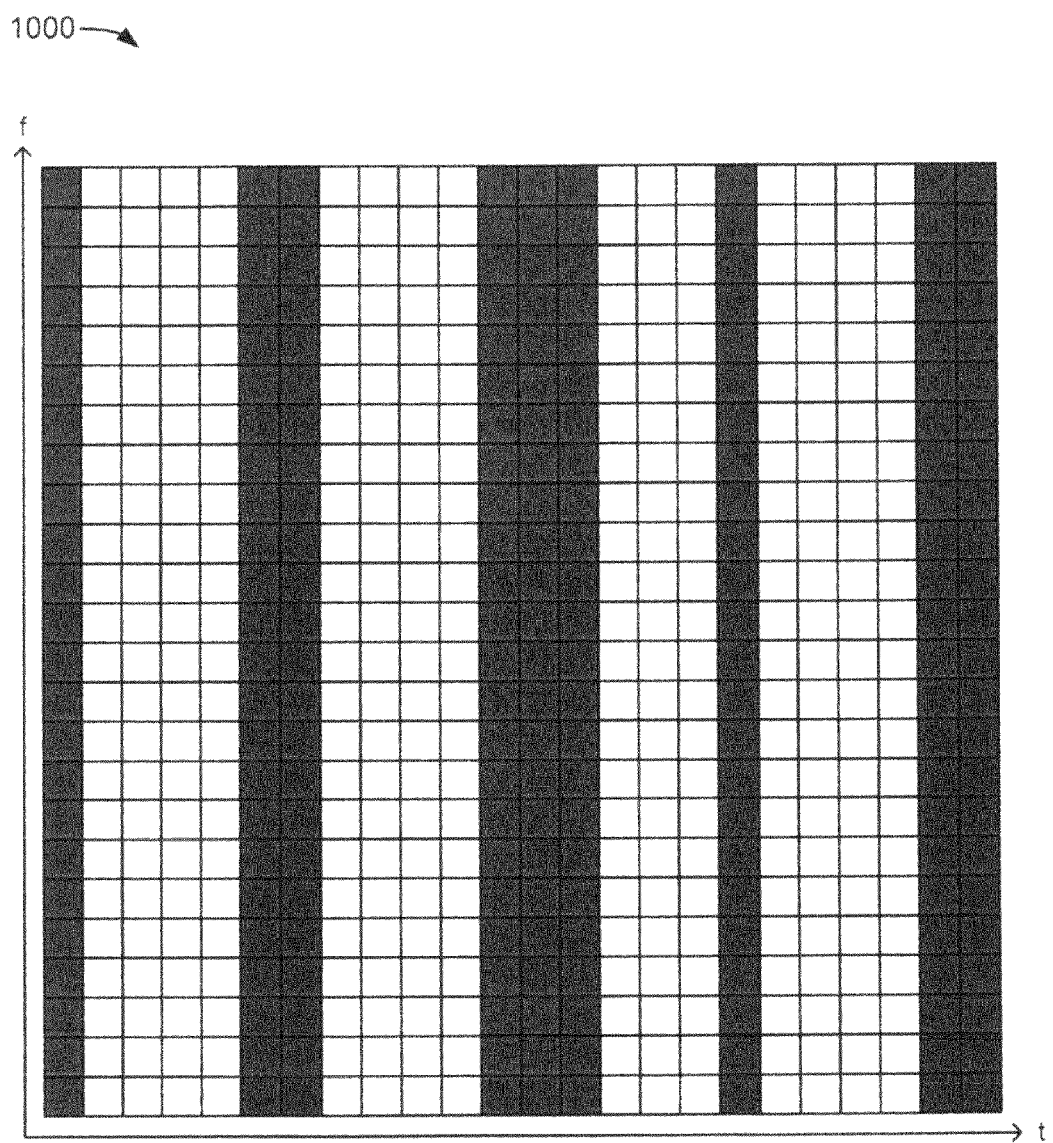

FIG. 10 depicts a conceptual frequency-time grid 1000 for an intermittent signal across an entire band. In this example, at certain times, the value of $\sigma^2$ is $\sigma_N^2$. However, at other times when the partial interference is expressing itself, the value of $\sigma^2$ is $\sigma_N^2 + q \cdot \sigma_I^2$. An example of an intermittent signal across an entire band is like 802.11n random access.

Various combinations of the examples of FIGS. 6-10 are possible for combinations of partial interference patterns from partially interfering sources. Referring once again to the example of FIG. 4, the flowchart 400 continues to block 414 where the effective noise value is applied to the signal to ameliorate partial interference applicable to the signal. This typically involves using effective noise in demodulation/demapping.

Multiple-Input Multiple-Output (MIMO) Partial Interference Amelioration

Figure 11:
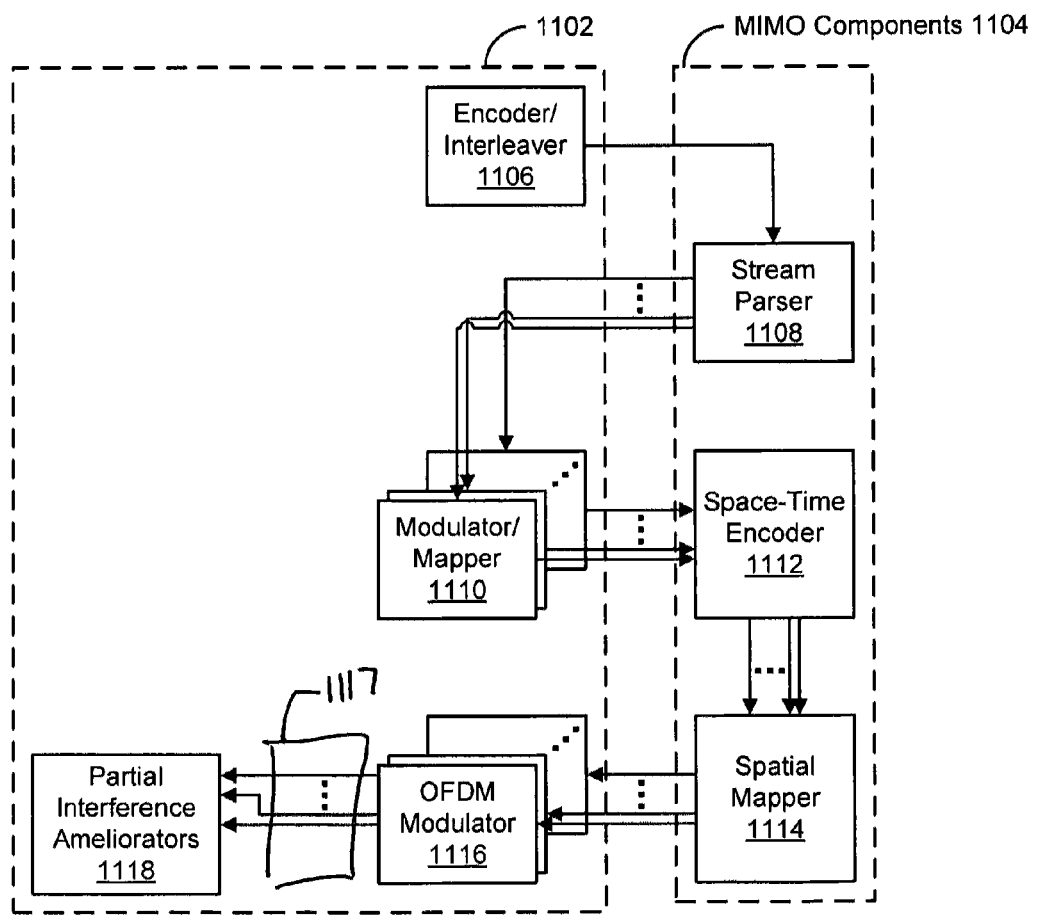
FIG. 11 depicts an example of a MIMO-OFDM system that ameliorates partial interference in an OFDM signal associated with each of multiple spatial streams.

FIG. 11 depicts an example of a MIMO-OFDM system 1100 that ameliorates partial interference in an OFDM signal associated with each of multiple spatial streams. The system 1100 includes components 1102 and MIMO components 1104. The components 1102 and MIMO components 1104 include an encoder/interleaver block 1106, a stream parser 1108, a plurality of modulator/mappers 1110, a space-time encoder 1112, a spatial mapper 1114, a plurality of OFDM modulators 1116, and an interference ameliorator 1118. As is shown in the example of FIG. 11, the stream parser 1108, the space-time encoder 1112, and the spatial mapper 1114 comprise the MIMO components 1104. One or more of the components 1102, in an alternative, could perhaps be implemented as MIMO components.

The encoder/interleaver block 1106, which is optional, may be similar to the encoder 106 and/or the interleaver 108 of FIG. 1. However, in the example of FIG. 11, the stream from the encoder/interleaver block 1106 is parsed by the stream parser 1108 into a plurality of signals. It should be noted that although the stream parser 1108 is included as part of the MIMO components 1104, the stream parser 1108 itself does not necessarily receive a single input, and could potentially have multiple inputs. Rather, the stream parser 1108 can prepare a signal for MIMO processing by breaking it into separate signals.

Each of the plurality of signals from the stream parser 1108 is provided to respective modulator/mappers of the plurality of modulator/mappers 1110. Each of the plurality of modulator/mappers 1110 may be similar to the modulator/mapper 110 of FIG. 1. The space-time encoder 1112 receives, encodes, and provides the plurality of signals to the spatial mapper 1114, which maps the plurality of signals onto respective ones of the plurality of OFDM modulators 1116. Each of the plurality of OFDM modulators may be similar to the modulator 112 of FIG. 1 (in an OFDM implementation, at least). The plurality of OFDM modulators 1116 provide the plurality of signals to the partial interference ameliorator 1118. The partial interference ameliorator 1118 may be similar to the partial interference amelioration block 104 of FIG. 1. Some of the components could be shared. For example, the partial interference ameliorator 1118 could have an associated interference estimator, but they could share a single noise estimator. The partial interference ameliorator 1118 could use a MIMO channel estimator to help compute the $\sigma_I^2$ and q in each spatial dimension.

As was described above with reference to FIGS. 1-10, $\sigma_I^2$ and q can have values that are functions of frequency, time, and the spatial dimension. The spatial parameter may have a single value for receivers with a single antenna, but have multiple values for systems that employ a number of antennae and/or a number of spatial streams in a MIMO system. One of skill in the relevant art should understand that this adds a third dimension to the conceptual diagrams of FIGS. 5-10, and has corresponding applicability to the system 100 (FIG. 1) when implemented with multiple spatial parameter values.

Systems described herein may be implemented on any of many possible hardware, firmware, and software systems. Algorithms described herein are implemented in hardware, firmware, and/or software, which is implemented in hardware. The specific implementation is not critical to an understanding of the techniques described herein and the claimed subject matter.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:
1. A system comprising:
a partial interference amelioration block, including:
  a quasi-static noise estimator;
  a dynamic partial interference estimator;
  a demodulator/demapper coupled to the quasi-static noise estimator and the dynamic partial interference estimator;
wherein, in operation,
  the quasi-static noise estimator provides a noise power value on a channel to the demodulator/demapper;
  the dynamic partial interference estimator provides an interference power value associated with the channel and an interference correction factor associated with the signal to the demodulator/demapper;

the demodulator/demapper ameliorates interference associated with the channel using the noise power value, the interference power value, and the interference correction value.

2. The system of claim 1, further comprising a transmitter block coupled to the partial interference amelioration block, wherein the transmitter block provides a signal to the partial interference amelioration block on the channel.

3. The system of claim 1, further comprising a transmitter block coupled to the partial interference amelioration block, wherein the transmitter block provides, as a multiple-input multiple-output (MIMO) signal, the signal to the partial interference amelioration block on the channel.

4. The system of claim 1, further comprising a channel estimator coupled to the demodulator/demapper.

5. The system of claim 1, further comprising a partial interferer input module, wherein, in operation, the partial interference amelioration block receives at the partial interferer input module an interference power value, wherein the interference power value is associated with at least some of the interference associated with the channel.

6. The system of claim 1, wherein the channel is associated with an orthogonal frequency division multiplex (OFDM) system, further comprising a frequency-hopping (FH) signal receiver, wherein, in operation, the FH signal receiver receives a FH signal associated with interference on the OFDM signal, and wherein the FH pattern can be predicted.

7. A system comprising:
a means for implementing $\sigma_I^2 = \sigma_N^2$ at a frequency, $f_1$, and a time, $t_1$, wherein $f_1$ is associated with a first narrow band of a wideband channel;
a means for implementing $\sigma_I^2 = \sigma_N^2 + q \cdot \sigma_I^2$ at a frequency, $f_2$, and a time, $t_2$, wherein $f_2$ is associated with a second narrow band of a wideband channel;
a means for ameliorating noise associated with a first signal received at the frequency $f_1$ and at the time $t_1$ using $\sigma_I^2$;
a means for ameliorating noise and interference associated with a second signal received at the frequency $f_2$ and at the time $t_2$ using $\sigma_2^2$.

8. The system of claim 7, wherein the first signal and the second signal are associated with a spatial parameter.

9. The system of claim 7, wherein:
the first signal is associated with a first spatial parameter;
the second signal is associated with a second spatial parameter;
the first spatial parameter has a different value than the second spatial parameter.

10. The system of claim 7, wherein $f_1 = f_2$.
11. The system of claim 7, wherein $f_1 \neq f_2$.
12. The system of claim 7, wherein $t_1 = t_2$.
13. The system of claim 7, wherein $t_1 \neq t_2$.

* * * * *